United States Patent
Berthon et al.

(10) Patent No.: US 10,350,840 B2
(45) Date of Patent: Jul. 16, 2019

(54) CREATION OF A TRANSPARENT WINDOW IN A SECURITY SUBSTRATE FOR SECURITY PRINTING APPLICATIONS

(71) Applicant: KBA-NotaSys SA, Lausanne (CH)

(72) Inventors: Aurélie Berthon, St-Prex (CH); Johannes Georg Schaede, Würzburg (DE)

(73) Assignee: KBA-NOTASYS SA, Lausanne (CH)

( * ) Notice: Subject to any disclaimer, the term of this patent is extended or adjusted under 35 U.S.C. 154(b) by 188 days.

(21) Appl. No.: 15/110,442

(22) PCT Filed: Jan. 16, 2015

(86) PCT No.: PCT/IB2015/050337
§ 371 (c)(1),
(2) Date: Jul. 8, 2016

(87) PCT Pub. No.: WO2015/107488
PCT Pub. Date: Jul. 23, 2015

(65) Prior Publication Data
US 2016/0339653 A1     Nov. 24, 2016

(30) Foreign Application Priority Data
Jan. 16, 2014   (EP) .................................. 14151506

(51) Int. Cl.
*D21H 27/32*    (2006.01)
*B29C 70/74*    (2006.01)
(Continued)

(52) U.S. Cl.
CPC ...... *B29C 70/745* (2013.01); *B29D 11/00278* (2013.01); *B29D 11/00298* (2013.01);
(Continued)

(58) Field of Classification Search
CPC .................. D21H 21/40; B29C 70/745; B29D 11/00298; B29D 11/00278; B29D 25/351
See application file for complete search history.

(56) References Cited

U.S. PATENT DOCUMENTS

| 5,671,671 A | 9/1997 | Wyssmann et al. |
| 7,922,858 B2 | 4/2011 | Eitel et al. |
| (Continued) | | |

FOREIGN PATENT DOCUMENTS

| CN | 101146954 A | 3/2008 |
| EP | 0 723 864 A1 | 7/1996 |
| (Continued) | | |

OTHER PUBLICATIONS

Hoffmuller et al., WO 2005/116335, machine translation. (Year: 2005).*

(Continued)

*Primary Examiner* — Galen H Hauth
(74) *Attorney, Agent, or Firm* — Nixon & Vanderhye P.C.

(57) ABSTRACT

There is described a method of creating a transparent window (W*) in a security, especially paper, substrate (1) for security printing applications, the method comprising the steps of (i) providing a security substrate (1), (ii) forming an opening (10*) into and through the security substrate (1), and (iii) filling the opening (10*) with transparent material (2) thereby forming the transparent window (W*). The filling of the opening (10*) with the transparent material (2) is carried out in a state where the opening (10*) is open on both sides of the security substrate (1) and extends through the security substrate (1), the filling of the opening (10*) including the application of a first side (I) of the security substrate (1) against a supporting surface (21A) of a supporting member (20', 21) in such a way as to block one side of the opening (10*), while the transparent material (2) is applied inside the opening (10*) from the other side (II) of (Continued)

the security substrate (1). Advantageously, the method further comprises the step of forming a field of lenses (L) on one side of the transparent window (W*), in particular by replicating the field of lenses (L) directly into the transparent material (2) filling the opening (10*). Also described is a suitable device designed to fill the opening (10*) with the transparent material (2).

19 Claims, 8 Drawing Sheets

(51) Int. Cl.
    *D21H 21/40*    (2006.01)
    *B42D 25/29*    (2014.01)
    *B29D 11/00*    (2006.01)
    *B29K 711/12*    (2006.01)
    *B29K 711/10*    (2006.01)

(52) U.S. Cl.
    CPC ............ *B42D 25/29* (2014.10); *D21H 21/40* (2013.01); *B29K 2711/10* (2013.01); *B29K 2711/12* (2013.01)

(56) References Cited

U.S. PATENT DOCUMENTS

| | | | |
|---|---|---|---|
| 8,465,625 B2 * | 6/2013 | Boehm | .................... D21F 1/44 162/110 |
| 8,636,047 B2 | 1/2014 | Eitel et al. | |
| 8,696,856 B2 | 4/2014 | Eitel et al. | |
| 8,967,221 B2 | 3/2015 | Eitel et al. | |
| 2009/0001709 A1 | 1/2009 | Kretschmar et al. | |
| 2010/0024511 A1 | 2/2010 | Eitel et al. | |
| 2011/0017393 A1 | 1/2011 | Eitel et al. | |
| 2011/0139362 A1 | 6/2011 | Eitel et al. | |
| 2011/0141522 A1 | 6/2011 | Vago | |
| 2011/0259513 A1 | 10/2011 | Eitel et al. | |
| 2013/0213246 A1 * | 8/2013 | Schaede | .................. B41F 11/02 101/76 |
| 2014/0151996 A1 * | 6/2014 | Camus | .................. D21H 21/40 283/67 |
| 2016/0200088 A1 | 7/2016 | Schaede | |

FOREIGN PATENT DOCUMENTS

| | | | |
|---|---|---|---|
| WO | 2005/116335 A1 | 12/2005 | |
| WO | WO2005116335 A1 * | 12/2005 | ........... B29C 70/745 |
| WO | 2008/104904 A1 | 9/2008 | |
| WO | 2009/112989 A1 | 9/2009 | |
| WO | 2010/000432 A1 | 1/2010 | |
| WO | 2010/001317 A1 | 1/2010 | |
| WO | 2015/022612 A1 | 2/2015 | |

OTHER PUBLICATIONS

Office Action dated Jul. 2, 2018 issued in Chinese Application No. 201580004547.1 (5 pages).

* cited by examiner

CREATION OF A TRANSPARENT WINDOW IN A SECURITY SUBSTRATE FOR SECURITY PRINTING APPLICATIONS

This application is the U.S. national phase of International Application No. PCT/IB2015/050337 filed 16 Jan. 2015 which designated the U.S. and claims priority to EP Application No. 14151506.4 filed 16 Jan. 2014, the entire contents of each of which are hereby incorporated by reference.

TECHNICAL FIELD

The present invention generally relates to the creation of a transparent window in a security substrate (especially a security paper substrate) for security printing applications, in particular for the production of banknotes and like securities.

BACKGROUND OF THE INVENTION

It is known to laminate at least partially transparent films onto one side of openings formed into and through security paper substrates, for instance from International (PCT) Publications Nos. WO 2008/104904 A1, WO 2009/112989 A1 and WO 2010/001317 A1 in the name of the present Applicant (which publications are all incorporated herein by reference in their entirety), for the purpose of creating at least partially transparent windows in such security paper substrates. The laminated film serves multiple purposes, including acting as a means to close one side of the opening that is formed into and through the substrate, as well as a means to allow optional filling of the opening with a transparent filling material.

The lamination of the at least partially transparent films however necessitates a dedicated processing step which increases production costs.

An alternate solution is therefore required with a view to create a transparent window in a security substrate.

SUMMARY OF THE INVENTION

A general aim of the invention is therefore to provide such an alternate solution.

More specifically, an aim of the present invention is to provide such a solution that can suitably allow for the creation of a transparent window in a security substrate, especially in a security paper substrate, that does not necessitate prior lamination of a film onto a surface of the substrate in order to close the opening formed into and through the substrate.

These aims are achieved thanks to the solutions recited in the claims.

In particular, there is claimed a method of creating a transparent window in a security substrate for security printing applications (especially a security paper substrate made e.g. of cotton fibres), the method comprising the steps of (i) providing a security substrate, (ii) forming an opening into and through the security substrate, and (iii) filling the opening with transparent material thereby forming the transparent window. According to the invention, the filling of the opening with the transparent material is carried out in a state where the opening is open on both sides of the security substrate and extends through the security substrate, the filling of the opening including the application of a first side of the security substrate against a supporting surface of a supporting member in such a way as to block one side of the opening, while the transparent material is applied inside the opening from the other side of the security substrate.

In this way, the need for lamination of a film on one side of the security substrate, in order to close one side of the opening prior to filling the opening, is eliminated.

There is also claimed a device designed to fill an opening formed into a security substrate with transparent material to form a transparent window in the security substrate, which opening is open on both sides of the security substrate and extends through the security substrate, the device comprising (i) at least one supporting member with a supporting surface against which a first side of the security substrate is applied during a filling of the opening with the transparent material in such a way as to block one side of the opening, and (ii) an application system including one or more application units designed to apply the transparent material inside the opening from the other side of the security substrate while the first side of the security substrate is applied against the supporting surface of the supporting member, thereby forming the transparent window.

There is also claimed a processing machine comprising (i) a system designed to form an opening into and through a security substrate, and (ii) a device in accordance with the invention designed to fill the opening with transparent material and thereby form a transparent window in the security substrate.

Also claimed is a security substrate (especially a security paper substrate made e.g. of cotton fibres) comprising a transparent window formed in accordance with the method of the invention.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Figure 1A:
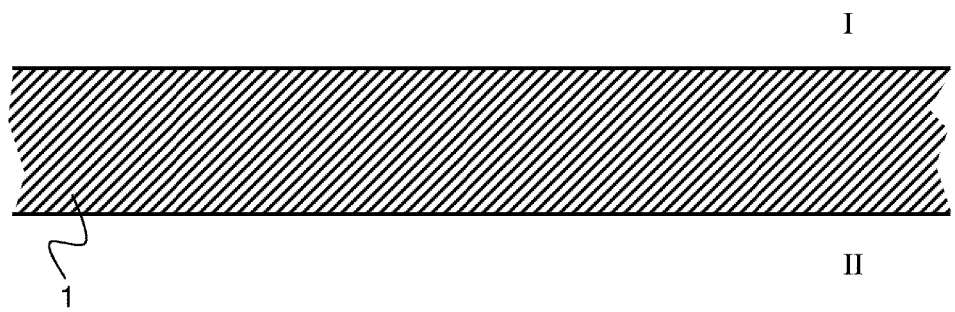
FIGS. 1A-E are schematic sectional views illustrating successive steps of an embodiment of a method of creating a transparent window in a security substrate in accordance with a first embodiment of the invention.
Figure 1B:
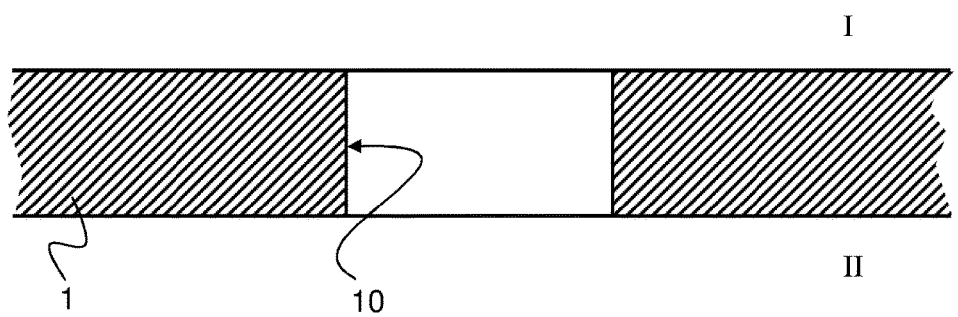
Figure 1C:
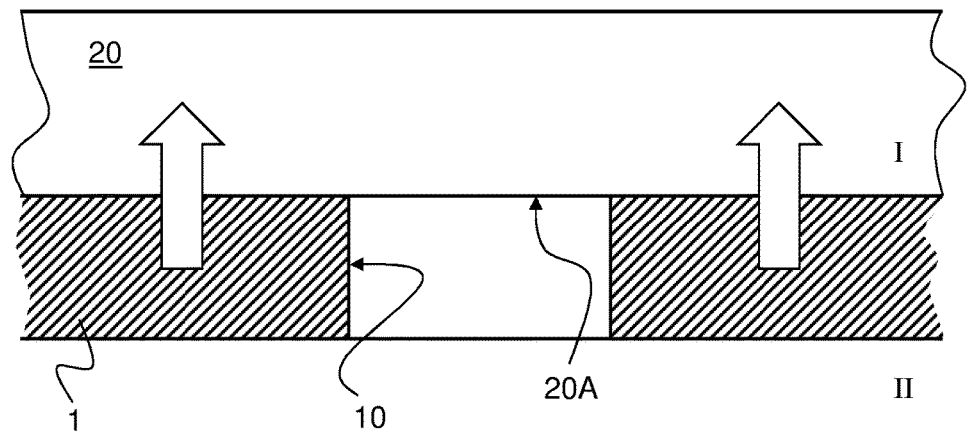
Figure 1D:
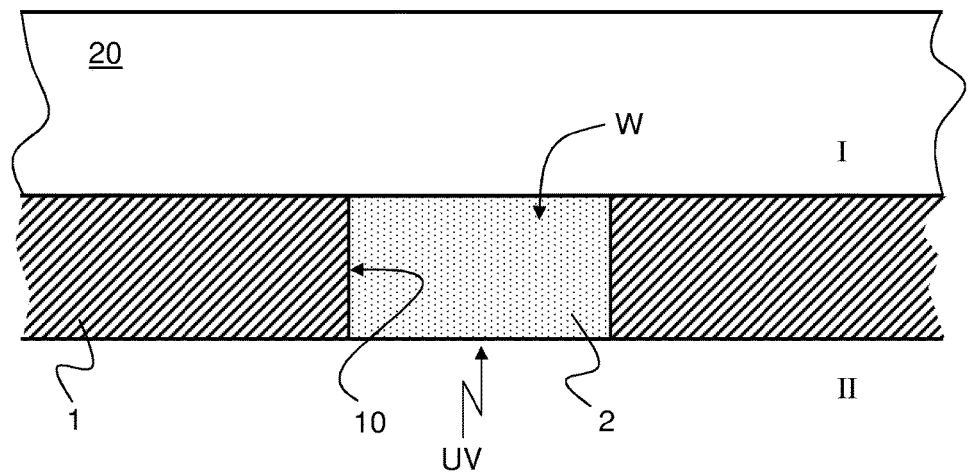

The present invention will be described in the particular context of the creation of transparent windows in security substrates which are provided in the form of successive sheets, the security substrates being provided with an opening which is formed into and through the substrate. The invention is however equally applicable to the processing of a security substrate in the form of a continuous web. The security substrate is typically a security paper substrate made of e.g. cotton fibres as conventionally used in banknote printing applications. The instant invention is however not limited to security paper substrates only and may be applied to the processing of any other suitable substrate material, including so-called hybrid substrates combining layers of polymer and paper material or composite substrates combining polymer and paper fibres. The instant invention is actually applicable to the processing of any type of substrate which is normally substantially opaque and within which one desires to create one or more transparent windows.

The expression "transparent window(s)" shall be understood as designating any opening formed into a security substrate and filled with a transparent material so as to exhibit, at least in part, transparent portions allowing an observer to see through the substrate. As this will be appreciated, features may be added to the transparent filling material and/or provided on one surface and/or the other of the transparent window so as to take advantage of the transparent properties of the window.

As such, the formation of openings into and through security substrates, in particular by punching or cutting a hole (for instance by laser cutting) into security paper sheets is known in the art. As already mentioned, the formation of such openings is usually followed by the lamination of a transparent film onto a first side of the security substrate so as to close on end of the opening, as for instance disclosed in International (PCT) Publications Nos. WO 2008/104904 A1, WO 2009/112989 A1 and WO 2010/001317 A1 in the name of the present Applicant, which publications are all incorporated herein by reference in their entirety. Filling material can subsequently be applied inside the opening as for instance disclosed in International (PCT) Publications Nos. WO 2005/116335 A1 and WO 2010/000432 A1, which are also incorporated herein by reference in their entirety. The invention differs from this known approach in that no film is applied on the surface of the security substrate in the region of the opening, prior to filling the opening.

This process is schematically illustrated by FIGS. 1A-E, 2A-E and 3 in reference to distinct illustrative embodiments of the invention.

In accordance with a first embodiment of the invention as illustrated by FIGS. 1A-E, the security paper substrate 1 is first provided with an opening 10, namely a through-hole. This can be performed by punching or cutting a hole through the thickness of the security substrate 1 (for instance by means of a suitable mechanical cutting tool or by means of a laser beam).

According to this first embodiment, and prior to filling the opening 10 with transparent material in order to form the desired transparent window, a first side I of the security substrate 1 is applied against a supporting surface 20A of an adequate supporting member 20 (see FIG. 1C) in such a way as to block one side of the opening 10, i.e. on the first side I of the security substrate 1. The substrate 1 remains in this state, while transparent material 2 is applied inside the opening 10 from the other (second) side II of the security substrate 1 (see FIG. 1D).

The supporting surface 20A may advantageously be provided with an anti-adhesive coating or layer designed to prevent adhesion with the transparent material 2.

The transparent material 2 is conveniently applied in a fluidic state inside the opening 10 and is subsequently solidified. This can in particular be done through the use of a UV-curable fluidic material, such as a UV-curable ink, varnish or polymer. In that context, the application of the UV-curable transparent material 2 is followed by a UV-curing operation in order to initiate reticulation, and therefore solidification of the transparent material 2.

Application of the transparent filling material 2 can be performed by any suitable process. A preferred method is to apply the transparent filling material 2 by screen printing.

The filling of the opening 10 can be carried out in a single step or, should this be required or more convenient, is several successive steps. In the latter case, subsequent layers of transparent material 2 could be applied one after the other inside the opening 10 and one could even contemplate to incorporate additional features (such as pigments or security elements) between two successive layers of transparent material 2, thereby embedding such features within the thickness of the transparent window W itself.

Figure 1E:
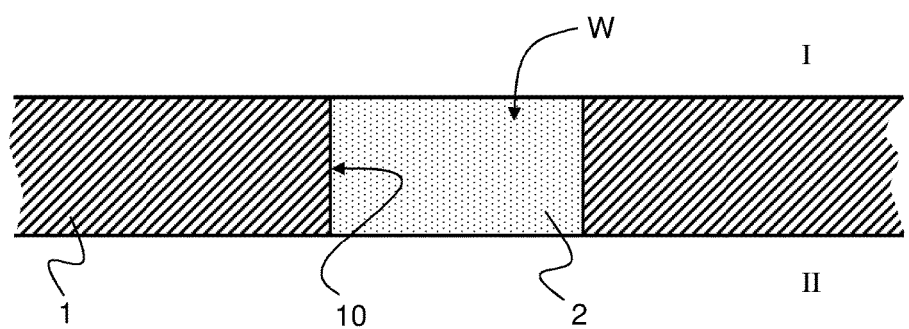

The resulting substrate 1, with its transparent window W, as schematically illustrated in FIG. 1E, could be further processed. For instance, a field of lenses (not shown) could be provided on one or the other side of the transparent window W, while the opposite side of the window W could be provided with a corresponding image pattern, coordinated with the field of lenses so as to create variable optical effects depending on the viewing angle, when viewed through the field of lenses. Such field of lenses could as a matter of fact be formed at the same time as the opening is filled with transparent material, as discussed in reference to the embodiment of FIGS. 2A-E and 3, or, alternatively, subsequently to the formation of the transparent window W, for instance by applying a layer of material in which the field of lenses is replicated or by applying a film of material already comprising the field of lenses.

FIGS. 2A-E illustrate a second embodiment of the invention wherein the security substrate 1 is provided with an opening 10* extending through the substrate 1 and exhibiting a geometry that is imparted to the opening 10* by shaping a surrounding thereof in order to secure adhesion of the transparent material inside the opening 10*. More precisely, the opening 10* exhibits a non-uniform cross-section with one section, in a middle portion of the thickness of the security substrate 1 (i.e. where the distance between opposing flanks of the opening 10* is the shortest), that exhibits a diameter which is less than that of sections of the opening 10* on either side I, II of the security substrate 1. This particular geometry ensures that the transparent filling material 2 is adequately secured to the opening 10* and can be imparted by shaping the surrounding of the opening 10*, during or subsequent to the formation of the opening 10*, in particular by compressing the security substrate 1 in the area immediately surrounding the opening 10*.

In contrast to the first embodiment, the first side I of the security substrate 1 is applied against a supporting surface 21A of a supporting member 20', 21 which includes a lens replicating medium 21 having a lens replicating structure 21B that is located on the supporting surface 21A (see FIG. 2C) so as to coincide with the position of the opening 10*. One side of the opening 10* is likewise blocked as a result, while transparent material 2 is applied inside the opening 10* from the second side II of the security substrate 1 (see FIG. 2D).

The supporting surface 21A may likewise advantageously be provided with an anti-adhesive coating or layer designed to prevent adhesion with the transparent material 2.

Part of the transparent material 2 could be applied directly onto a portion of the supporting surface 21A, in particular in order to pre-fill the lens replicating structure 21B prior to pressing the first side I of the security substrate 1 against the supporting surface 21A of the supporting member 20', 21. This improves the filling of the opening 10* and ensures that all relevant portions of the opening 10* are appropriately filled with transparent material 2. This further ensures optimum replication of the desired field of lenses L.

This approach could also be applied in the context of the first embodiment of FIGS. 1A-E, even though no lenses are replicated, by similarly applying transparent material 2 to a portion of the supporting surface 20A coinciding with the opening 10, prior to application of the first side I of the security substrate 1 against the supporting surface 20A of the supporting member 20.

Like in the first embodiment, the transparent material 2 is preferably a UV-curable material that is applied in a fluidic state, and then solidified by UV-curing. In this other embodiment, the transparent polymer material 2 is likewise preferably cured by UV radiation from the second side II of the security substrate 1, while the security substrate 1 is in contact with the supporting surface 21A of the supporting member 20', 21.

Figure 2A:
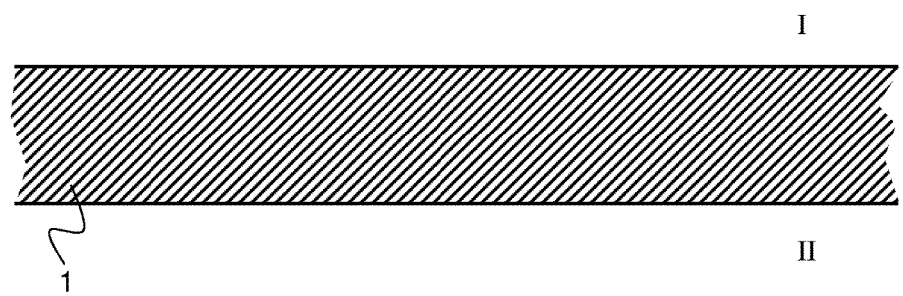
FIGS. 2A-E are schematic sectional views illustrating successive steps of an embodiment of a method of creating a transparent window in a security substrate in accordance with a second embodiment of the invention.
Figure 2B:
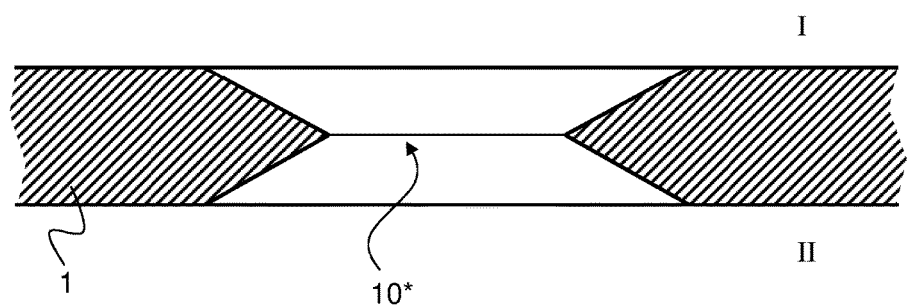
Figure 2C:
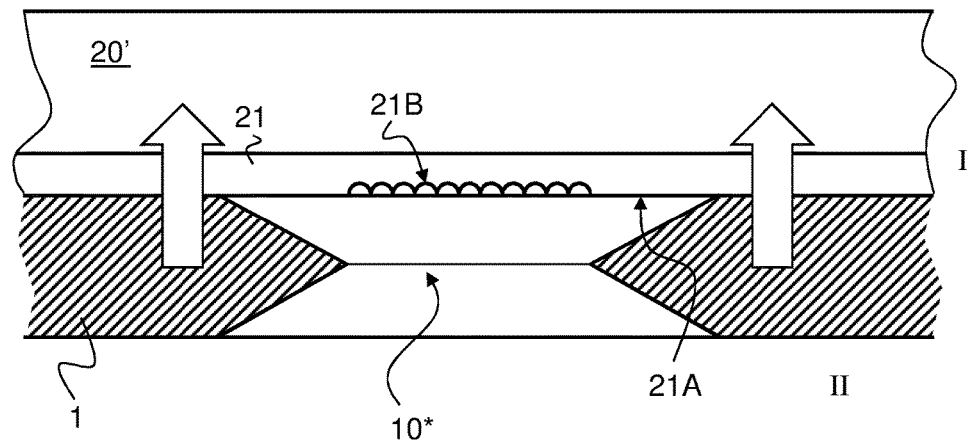
Figure 2D:
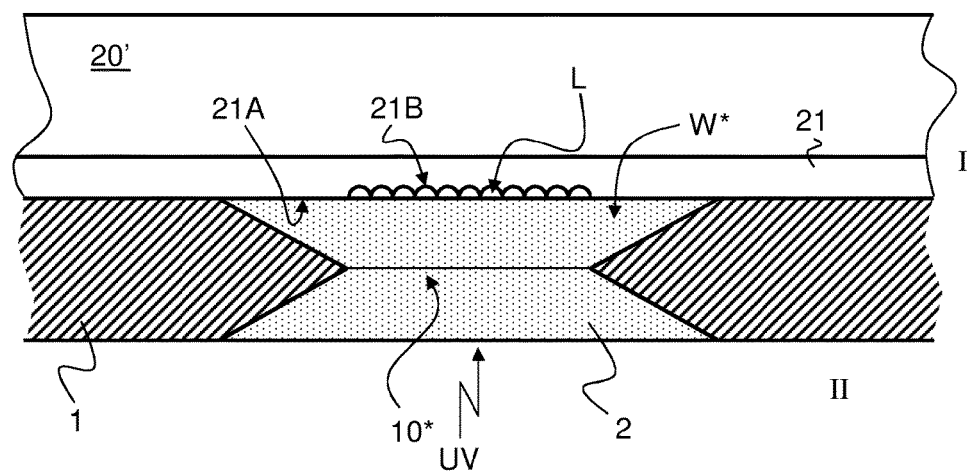
Figure 2E:
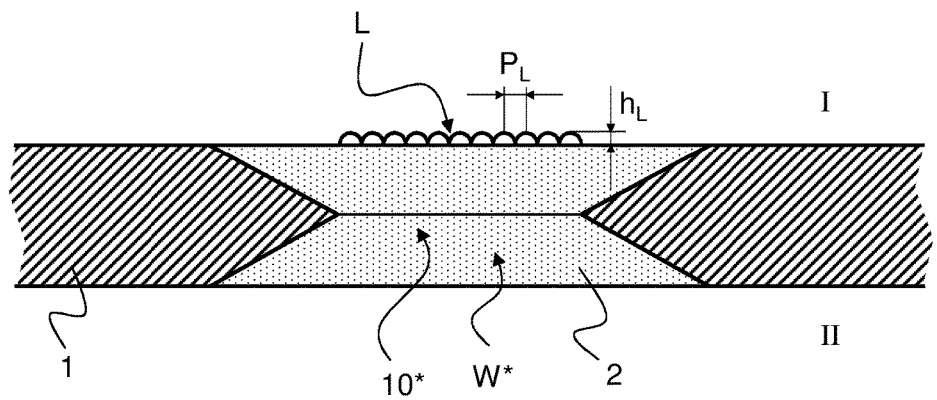

The resulting substrate 1 with its window W* provided on one side with a field of lenses L is schematically depicted in FIG. 2E. The lenses L preferably have a lens pitch $P_L$ of the order of 10 to 50 µm and a lens height $h_L$ of the order of 10 to 20 µm. In comparison, the overall thickness of the security paper substrate is of the order of 60 to 120 µm.

Figure 3:
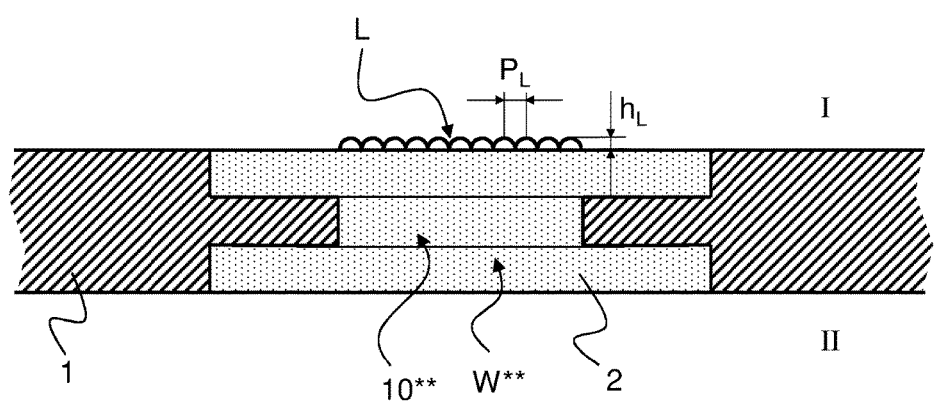
FIG. 3 is a schematic sectional view illustrating a security substrate provided with a transparent window created in accordance with a third embodiment of the invention.

FIG. 3 shows a security substrate 1 provided with a transparent window W created in accordance with a third embodiment of the invention. This embodiment differs from the embodiment illustrated in FIG. 2E in that the surrounding of the opening 10 is shaped differently, but with a view to achieve a similar objective, namely securing adhesion of the transparent material 2 inside the opening 10. As illustrated, the window W is likewise provided with a field of lenses L that is advantageously replicated directly into the transparent material 2 filling the opening 10**.

As a result of the filling of the openings 10, 10*, 10** with the transparent polymer material 2, there is formed a transparent polymer window W, W*, W** in the security substrate which exhibits a thickness in the order of magnitude of the thickness of the security substrate 1. The security substrate 1 thus provided with the transparent polymer window W, W*, W** can suitably be printed on the first side I and/or second side II with patterns. In the context of the embodiment of FIGS. 2A-E and 3, the second side II of the security substrate 1 can in particular be printed in the region of the transparent window W*, W**, in register with the lenses L, so as to interact with the lenses L and form an optically-variable security feature that is observable through the window W*, W** and lenses L, from the first side I of the security substrate 1.

As this will be appreciated hereinafter, the transparent material 2 is preferably applied by screen-printing using one or more screen-printing units as application unit(s). More than one application units may be necessary in order to suitably apply transparent material 2 in a quantity sufficient to fill the opening 10, 10*, 10**.

Figure 4:
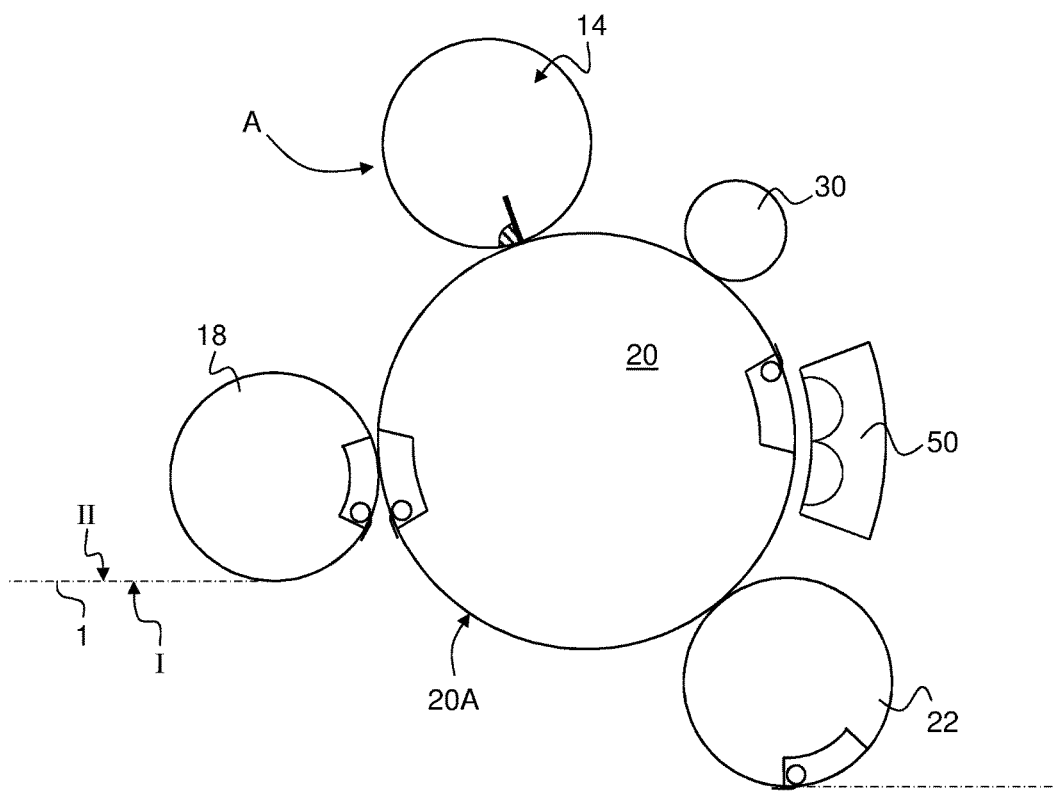
FIG. 4 is a schematic side view of a device designed to fill an opening formed into and through a security substrate with transparent material in accordance with a first variant of the invention.

FIG. 4 is illustrative of a first variant of a device designed to fill the opening 10 formed into the security substrate 1 with transparent material 2 in accordance with the methodology that was previously described in reference to FIGS. 1A-E. The device of FIG. 4 is in particular designed to process security substrates 1 in the form of individual sheets that are transported one after the other in succession and that have already been provided with the desired openings 10. The formation of the openings 10 can be carried out in an in-line process upstream of the depicted device of FIG. 4.

In the context of FIG. 4, the security substrate 1 is transferred to a supporting cylinder 20 (which also acts as transport cylinder in this illustrative example) by means of transfer cylinder 18. This supporting cylinder 20 acts as supporting member for the first side I of the security substrate 1, with a circumference 20A of the supporting cylinder 20 acting as the supporting surface against which the first side I of the security substrate 1 is pressed. An application system A is provided, which comprises an application unit 14 designed to cooperate with the supporting cylinder 20 and the second side II of the security substrate 1 in order to apply the transparent material 2 in the opening 10 formed in the security substrate 1. This application unit 14 is preferably designed as a screen-printing unit. A suitable screen-printing unit is for instance disclosed in European Patent Publication No. EP 0 723 864 A1 in the name of the present Applicant, which is incorporated herein by reference in its entirety.

Downstream of the application unit 14, there is preferably provided a pressure roller 30 which is designed to press the security substrate 1 from the second side II, thereby ensuring proper penetration of the transparent material 2 into the openings 10. Additional pressure rollers may be provided in order to ensure optimum application of the security substrate against the circumference 20A of the supporting cylinder 20. A surface of the pressure roller(s) 30 could advantageously be structured to come into contact only with portions of the security substrate 1 outside of the regions of the openings where the transparent material is applied.

The device further comprises a UV-curing unit 50 cooperating with the supporting cylinder 20 in order to cure the UV-curable material 2 from the second side II of the security substrate 1, while the security substrate 1 is in contact with the supporting surface 20A of the supporting cylinder 20.

Subsequent to the UV-curing operation, the security substrate 1 is taken away from the supporting cylinder 20 and transferred to a transfer cylinder 22 for delivery or further processing.

Figure 5:
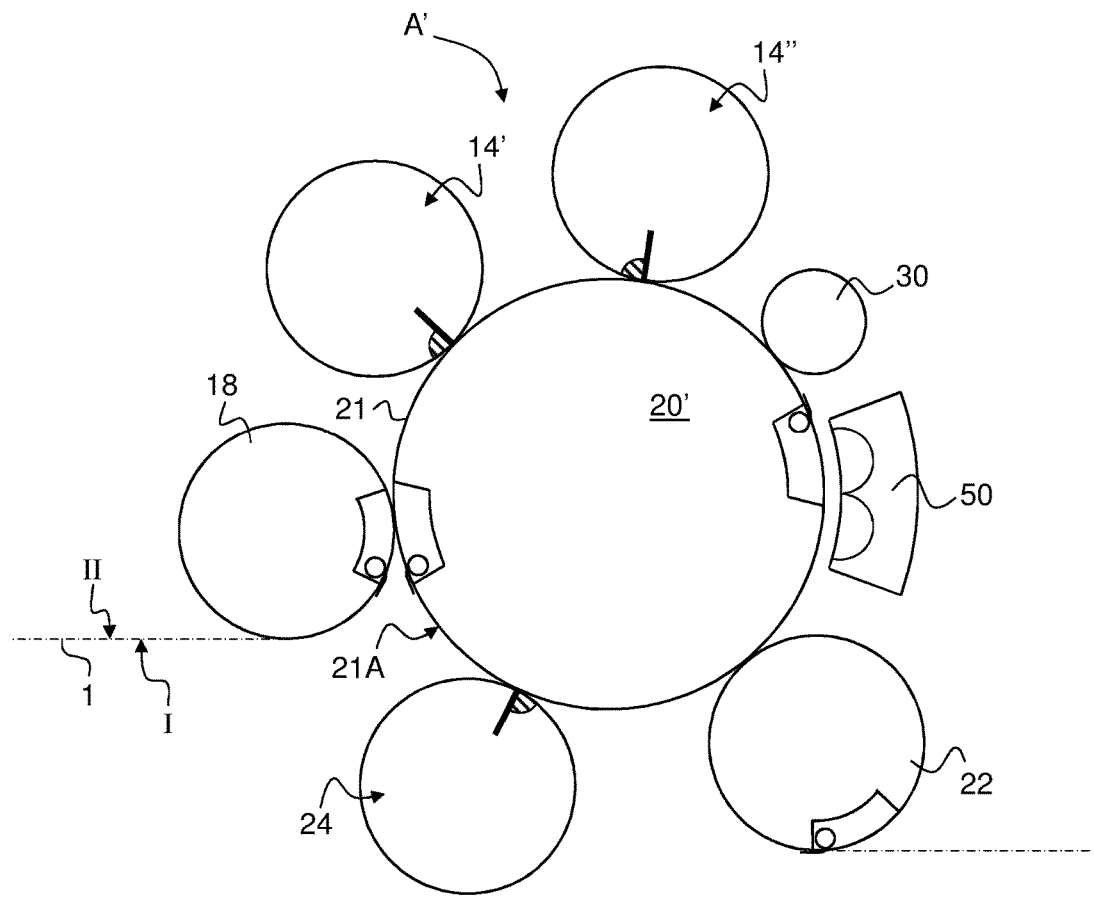
FIG. 5 is a schematic side view of a device designed to fill an opening formed into and through a security substrate with transparent material in accordance with a second variant of the invention.

FIG. 5 is illustrative of a second variant of a device designed to fill the opening 10*, respectively 10**, formed into the security substrate 1 with transparent material 2 in accordance with the methodology that was previously described in reference to FIGS. 2A-E and 3. This other variant differs from that of FIG. 4 in various aspects. Firstly, the supporting member is designed in this variant as a supporting cylinder 20' carrying a lens replicating medium 21 (as described above), the surface 21A of the lens replicating medium 21 acting as the supporting surface. Secondly, two application units 14', 14" (which are likewise preferably constructed as screen-printing units) cooperate with the supporting cylinder 20' and the lens replicating medium 21. In addition, a further application unit 24 (similarly preferably constructed as a screen-printing unit) is located upstream of the transfer cylinder 18 so as to apply transparent material 2 onto a portion of the surface 21A of the lens replicating medium 21 (where the lens replicating structure 21B is located) prior to transfer of the security substrate 1 to the supporting cylinder 20' by the transfer cylinder 18.

Various modifications and/or improvements may be made to the above-described embodiments without departing from the scope of the invention as defined by the annexed claims. For instance, in the illustrative example of FIG. 5, an intermediate UV-curing unit may be provided between the two application units 14', 14" in order to initiate curing of the transparent material 2 applied by the first application unit 14'. In addition, as already mentioned, one or more application units may be interposed between the two application units 14', 14" in order to incorporate additional features (such as pigments or security elements) between two successive layers of transparent material 2, thereby effectively embedding such features within the thickness of the transparent window itself.

LIST OF REFERENCE NUMERALS USED THEREIN

1 security substrate (especially security paper substrate made e.g. of cotton fibres)

I first side of the security substrate 1

II second side of the security substrate 1, opposite to the first side I

W, W*, W transparent window formed in the security substrate 1**

L field of lenses formed onto the surface of the window W*, W in register with the opening 10*, 10*** (FIGS. 2A-2E, 3)

$P_L$ lens pitch (spacing between adjacent lenses—preferably in the range of 10 to 50 μm)

$h_L$ lens height (preferably in the range of 10 to 20 μm) transparent material (in particular UV-curable material) used to fill the opening 10, 10* formed into and through the security substrate 1

10, 10*, 10* opening (through-hole) formed into the thickness of the security substrate 1

A, A' application system for applying the transparent material 2

14, 14', 14" application unit(s), in particular screen-printing unit(s) designed to apply (at least part of) the transparent material from the second side II of the security substrate 1

18 transfer cylinder (upstream side) cooperating with the supporting cylinder 20, 20'

20 supporting cylinder (support member) cooperating with the application unit 14 and supporting the first side I of the security substrate 1

20A supporting surface of the supporting cylinder (support member) 20 in contact with the first side I of the security substrate 1

20' supporting cylinder cooperating with the application units 14', 14" (and 24) and supporting the first side I of the security substrate 1

21 lens replicating medium carried by the supporting cylinder 20' (jointly acting as supporting member with the supporting cylinder 20') designed to form the field of lenses L onto the surface of the window W*, W and to support the first side I of the security substrate 1 via the lens replicating medium 21** (FIGS. 2C, 2D, 5)

21A supporting surface of the lens replicating medium 21 carried by the supporting cylinder 20' in contact with the first side I of the security substrate 1

21B lens replicating structure of the lens replicating medium 21

22 transfer cylinder (downstream side) cooperating with the supporting cylinder 20, 20'

24 additional application unit, in particular screen-printing unit, designed to apply part of the transparent material from the first side I of the security substrate 1

30 pressure roller cooperating with the second side (II) of the security substrate 1 and pressing the security substrate 1 against the supporting surface 20A, 21A

50 UV-curing unit cooperating with the supporting cylinder 20, 20' to cure the transparent (UV-curable) material 2 from the second side II of the security substrate 1

The invention claimed is:

1. A device designed to fill an opening formed into a security substrate with transparent material to form a transparent window in the security substrate, said opening being open on both sides of the security substrate and extending through the security substrate, the device comprising:
   at least one supporting member with a supporting surface against which a first side of the security substrate is applied during a filling of the opening with the transparent material in such a way as to block one side of the opening, the at least one supporting member including a supporting cylinder;
   an application system including one or more application units designed to apply the transparent material inside the opening from the other side of the security substrate while the first side of the security substrate is applied against the supporting surface to form the transparent window, the one or more application units including at least one screen-printing unit designed to apply the transparent material directly or indirectly into the opening of the security substrate; and
   at least one pressure roller located downstream of the application system and designed to press the security substrate against the supporting surface.

2. The device according to claim 1, further comprising at least one UV curing unit designed to subject the transparent material to a UV curing operation prior to the security substrate leaving the at least one supporting member.

3. The device according to claim 1, wherein the at least one supporting member includes a lens replicating medium designed to form a field of lenses on one side of the transparent window, said lens replicating medium including a lens replication structure designed to replicate lenses into the transparent material filling the opening, said lens replicating medium having a surface coming in contact with the first side of the security substrate and acting as the supporting surface.

4. The device according to claim 1, wherein the one or more application units includes at least two application units designed to apply the transparent material in successive steps.

5. The device according to claim 4, further comprising an intermediate UV-curing unit interposed between the at least two application units.

6. The device according to claim 4, further comprising an additional application unit interposed between the at least two application units and designed to incorporate additional features between at least two successive layers of the transparent material.

7. The device according to claim 1, wherein the one or more application units includes an application unit designed to apply part of the transparent material onto a portion of the supporting surface coinciding with the location of the opening prior to application of the first side of the security substrate against the supporting surface.

8. The device according to claim 1, wherein the supporting surface is provided with an anti-adhesive coating or layer designed to prevent adhesion with the transparent material.

9. A processing machine comprising:
   a system designed to form an opening into and through a security substrate; and a device in accordance with claim 1 designed to fill the opening with the transparent material and thereby form a transparent window in the security substrate.

10. A processing machine comprising:

a system designed to form an opening into and through a security substrate, said opening being open on both sides of the security substrate and extending through the security substrate; and a device designed to fill the opening with transparent material and thereby form a transparent window in the security substrate, the device comprising:

- at least one supporting member with a supporting surface against which a first side of the security substrate is applied during a filling of the opening with the transparent material in such a way as to block one side of the opening, wherein the at least one supporting member comprises a supporting cylinder;
- an application system including one or more application units designed to apply the transparent material inside the opening from the other side of the security substrate while the first side of the security substrate is applied against the supporting surface to form the transparent window, wherein the one or more application units includes at least one screen-printing unit designed to apply the transparent material directly or indirectly into the opening of the security substrate;
- at least one pressure roller located downstream of the application system and designed to press the security substrate against the supporting surface; and
- at least one UV curing unit designed to subject the transparent material to a UV curing operation prior to the security substrate leaving the at least one supporting member.

11. The processing machine according to claim 10, wherein the at least one supporting member includes a lens replicating medium designed to form a field of lenses on one side of the transparent window, said lens replicating medium including a lens replication structure designed to replicate lenses into the transparent material filling the opening, said lens replicating medium having a surface adapted to contact the first side of the security substrate and act as the supporting surface.

12. The processing machine according to claim 10, wherein the one or more application units includes at least two application units designed to apply the transparent material in successive steps, and wherein the device further comprises an intermediate UV-curing unit interposed between the at least two application units.

13. The processing machine according to claim 12, wherein the one or more application units further includes an additional application unit interposed between the at least two application units and designed to incorporate additional features between at least two successive layers of the transparent material.

14. The processing machine according to claim 13, wherein the additional features include at least one of pigments and security elements.

15. The processing machine according to claim 10, wherein the one or more application units includes an application unit designed to apply part of the transparent material onto a portion of the supporting surface coinciding with the location of the opening prior to application of the first side of the security substrate against the supporting surface.

16. The processing machine according to claim 10, wherein the supporting surface is provided with an anti-adhesive coating or layer designed to prevent adhesion with the transparent material.

17. The processing machine according to claim 10, wherein a surface of the at least one pressure roller is structured to come into contact only with portions of the security substrate outside of the regions of the openings where the transparent material is applied.

18. The device according to claim 2, wherein the at least one pressure roller is positioned upstream of the UV-curing unit.

19. The processing machine according to claim 10, wherein the at least one pressure roller is positioned upstream of the UV-curing unit.

* * * * *